E. C. WHITE.
BRAKE FOR AIRCRAFT.
APPLICATION FILED AUG. 21, 1920.
1,413,086.
Patented Apr. 18, 1922.
3 SHEETS—SHEET 3.
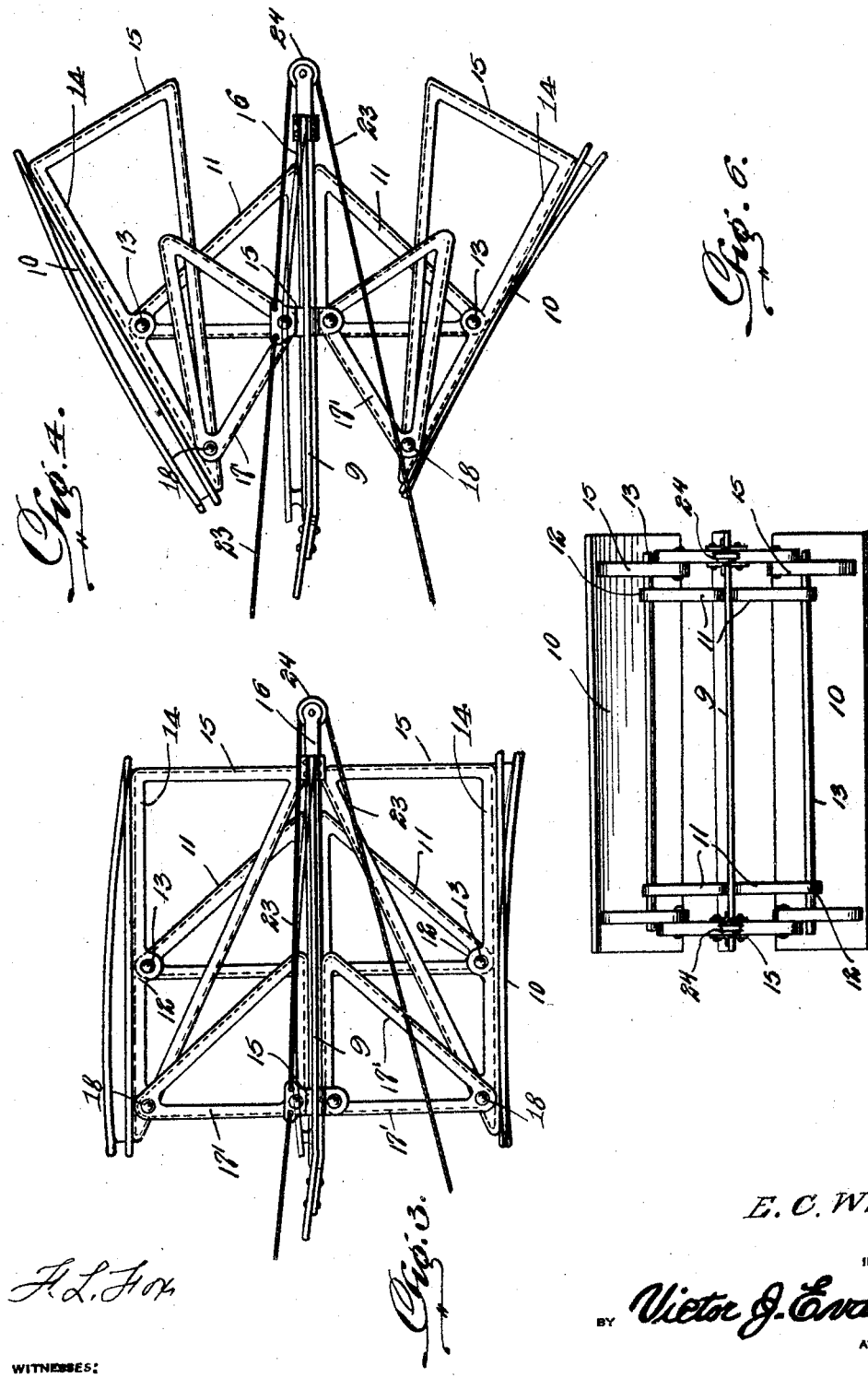
E. C. White.
INVENTOR
BY Victor J. Evans.
ATTORNEY

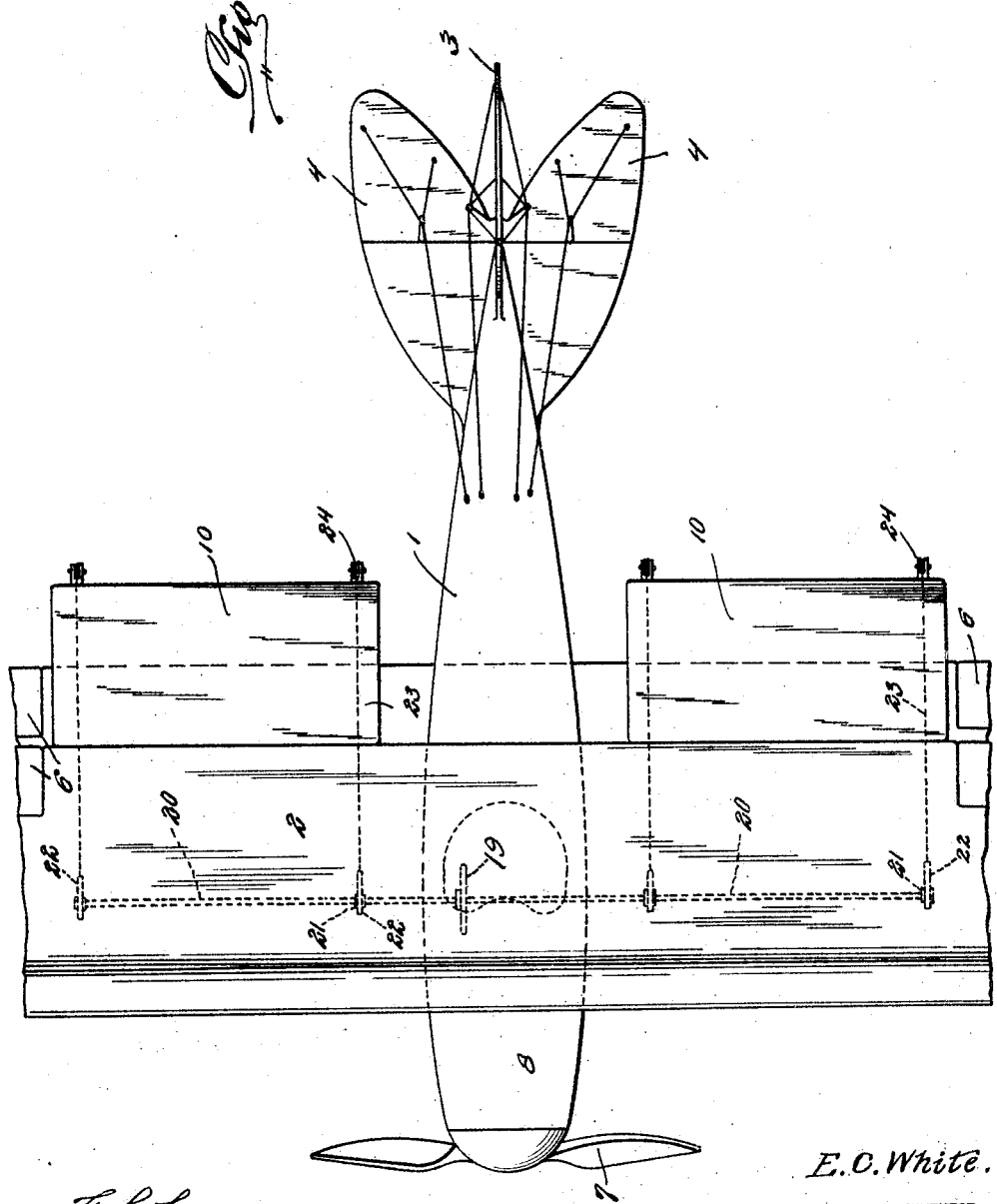

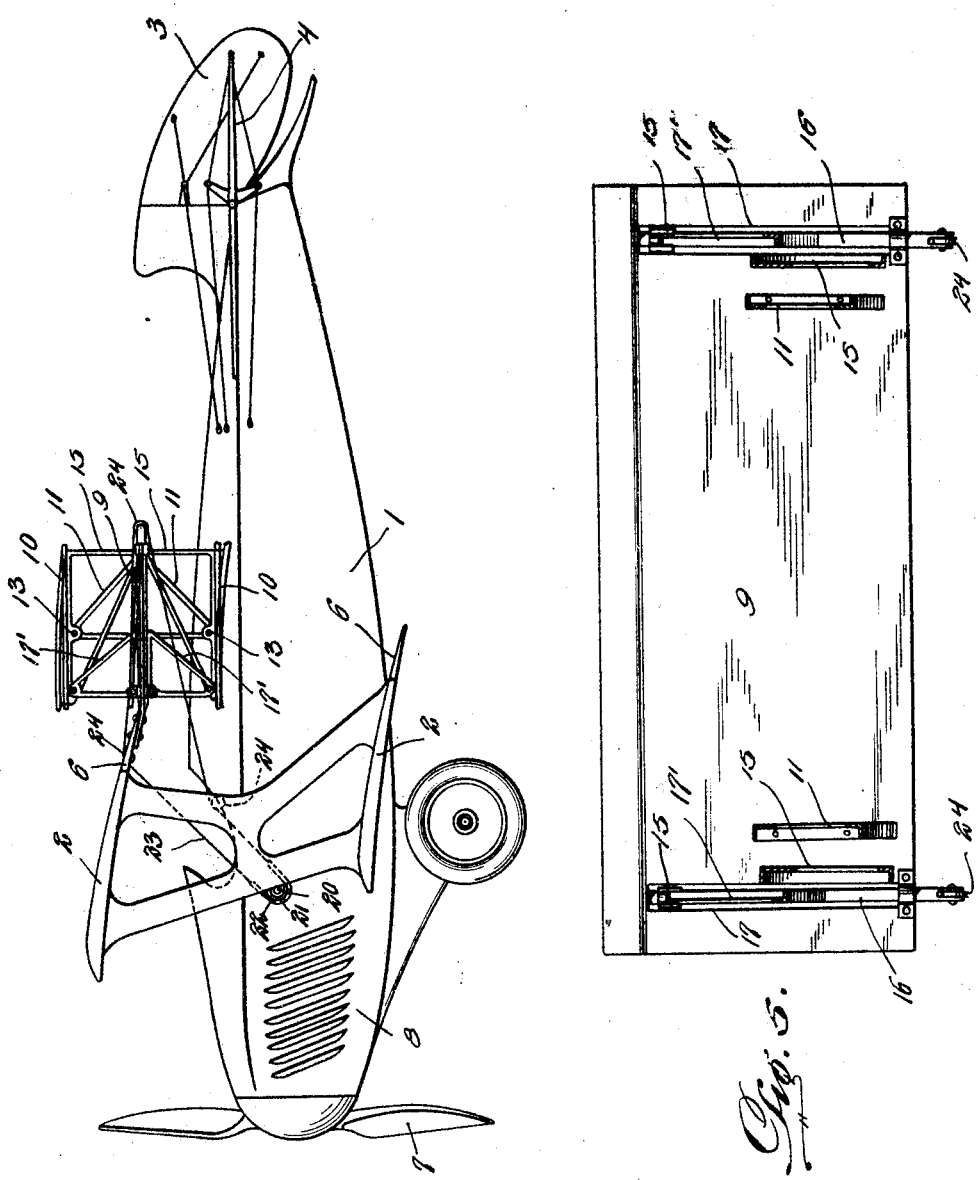

UNITED STATES PATENT OFFICE.

ELMER C. WHITE, OF OCEANO, CALIFORNIA.

BRAKE FOR AIRCRAFT.

1,413,086. Specification of Letters Patent. Patented Apr. 18, 1922.

Application filed August 21, 1920. Serial No. 405,061.

*To all whom it may concern:*

Be it known that I, ELMER C. WHITE, a citizen of the United States, residing at Oceano, in the county of San Luis Obispo and State of California, have invented new and useful Improvements in Brakes for Aircraft, of which the following is a specification.

This invention relates to aircraft and particularly to braking means for aircraft, the broad object in view being to provide an airbrake or as it is sometimes termed a wind brake for use in conjunction with airplanes either of the monoplane or biplane type for the purpose of quickly checking the speed of the machine and making a safe and successful landing after the completion of a flight.

A further object of the invention is to provide a novel arrangement of braking planes, the construction of which adapts them to produce a lifting action on the machine while in actual flight, said braking planes being adapted to be tilted or moved into braking position at the will of the aviator or operator of the machine at such time as it may be expedient to check the speed of the machine.

By means of the construction and arrangement hereinafter described, the lifting surface, including the braking planes, are materially reduced when the braking planes are thrown into braking position, thereby additionally decreasing the tendency of the machine to rise or bounce from the ground when the launching space contacts therewith in making a landing.

With the above and other objects in view, the invention consists in the novel construction, combination and arrangement of parts hereinafter fully described, illustrated and claimed.

In the accompanying drawings,

Figure 1 is a plan view of an airplane, showing the braking mechanism.

Figure 2 is a side elevation thereof, showing the normal flying position of the braking planes.

Figure 3 is an enlarged fragmentary side elevation, showing the braking planes and connections in their normal flying positions.

Figure 4 is a similar view showing the braking planes in their useful positions.

Figure 5 is an enlarged fragmentary horizontal section through the brake mechanism, showing the fixed surface in plan.

Figure 6 is a rear elevation showing the brake mechanism in its useful position.

The machine which I have illustrated in the accompanying drawings is of the biplane type, embodying a fuselage 1 and upper and lower supporting surfaces 2 which are arranged in superimposed relation to each other and are suitably braced in relation to each other and secured to the fuselage. The machine is shown as embodying a vertical rudder 3, a horizontal rudder or elevator 4, ailerons or lateral balance surfaces 6 and a tractor propeller 7 in rear of which is the propeller driving engine in the compartment 8, constituting the bow or nose portion of the fuselage.

In carrying out the present invention I arrange in rear of one of the supporting surfaces 2, a fixed plane or surface 9, which if desired may be cambered, to give a lifting effort so that said fixed surface will more than compensate for its own weight. The fixed surface extends rearwardly therefrom and is attached to the trailing edge of the main supporting surface 2, as shown in the drawings.

Arranged above and beneath the fixed surface 9 are upper and lower braking planes 10. The braking planes are in spaced relation to the fixed surface or planes 9 and are pivotally connected to the fixed surface by means of triangular brackets 11. These brackets 11 are fixedly secured to opposite sides of the fixed surface 9 and have bearings 12 for shafts 13 which are secured to the inner surfaces of the top and bottom braking planes 10 by means of straps 14.

Secured fixedly to the bottom of the upper braking planes 10 are triangular-shaped brackets or straps 15 and similar stops or brackets are rigidly secured to the upper surface of the bottom braking plane 10. The brackets 15 are adapted to come in contact with the fixed surface 9 and thereby serve to determine and maintain the normal flying angles of incidence of said top and bottom planes, the latter being cambered, as shown, so as to produce a lifting effort upon the machine as a whole.

The means for tilting or rocking the braking planes 10, consists of runners 15 which are movable along guides 16 extending in a fore-and-aft direction through slots 17 in the fixed surface 9 and projecting in rear thereof for a purpose which will appear.

Triangular-shaped links 17' are interposed between the runners and the top and bottom braking planes 10 which are connected to said braking planes by pivots 18. The shape of the links 17' is such that they serve to limit the movements of the braking planes and sustain the latter in a proper flying attitude at one limit of their movement, as shown in the drawings.

In the present embodiment of the invention, at least two sets of braking planes are used in conjunction with the main supporting surfaces of the airplane, one set being shown arranged at each side of the fuselage, so as to produce an equal checking movement at both sides of the machine, without any tendency to cause the machine to change its normal straight ahead direction, the direction of the machine being, as usual, under the control of the vertical rudder. It is to be understood that where more than two main supporting surfaces are employed in an airplane, braking planes may be used in conjunction with each supporting surface so employed.

The means for tilting or rocking the braking planes is shown as consisting of a controlling hand wheel 19 which serves to impart movement to a shaft 20 connected with the braking planes by sprocket wheels 21 and chains 22 and flexible connections, such as cables or chains 23, passing around pulleys 24 journaled on the rear ends of the guides carried by the fixed surface 9 and hereinabove described in detail. By such means, the operator of the machine may rock the braking planes from a substantially horizontal or flying position to a substantially vertical or edge to edge braking position and vice versa.

It will be understood from the drawings taken in connection with the foregoing description that the several planes of the braking mechanism serve to produce a decided lifting effort upon the machine as a whole and thereby more than compensate for their own weight. In making a landing, in order to check the speed of the machine, the braking planes are tilted or rocked to positive and negative angles of incidence and may be tilted to an extent which will bring them to a substantially vertical edge to edge position and perpendicular to the fixed surfaces of the braking units. Before starting upon a flight, the braking planes are first tilted to their normal flying positions where they have an angle of incidence and the necessary camber to insure a lifting effort upon the machine. In checking progress of the machine upon effecting a safe landing the braking planes would at one and the same time reduce materially the total area of lifting surface of the machine and offer greatly increased head resistance. This brings the machine to an early stop and reduces the tendency of the machine to rebound from the ground upon its initial contact therewith.

The braking mechanism may be easily adapted to any make of airplane or aircraft and will effect a material reduction in the number of accidents and fatalities due to the inability of the standard type of airplane to stop within a limited space, such as a small field.

What I claim is:—

1. In an airplane, the combination with a main supporting surface, of braking means embodying upper and lower air resistance planes each pivotally supported between its leading and trailing edges and normally held at a predetermined normal flying angle of incidence, and manually controlled means for rocking said braking planes to increased resisting angles of incidence, said means including a fore-and-aft guide, a runner to traverse said guide and having a linked connection with said braking planes and shifting means for said runner.

2. In an airplane, the combination with a main supporting surface, of braking means embodying upper and lower air resistance planes each pivotally supported between its leading and trailing edges and normally held at a predetermined normal flying angle of incidence, a fixed plane arranged between said braking planes, linkages between said fixed plane and the braking planes and manually controlled means for rocking said braking planes to increased resisting angles of incidence.

3. In an airplane, the combination with a main supporting surface, of braking means embodying upper and lower air resistance planes each pivotally supported between its leading and trailing edges and normally held at a predetermined normal flying angle of incidence, a fixed plane in trailing relation to said main supporting surface and between said braking planes and means for rocking the latter into substantially perpendicular relation to said fixed plane.

4. In an airplane, the combination with a main supporting surface, of braking means embodying upper and lower air resistance planes each pivotally supported between its leading and trailing edges and normally held at a predetermined normal flying angle of incidence, a fixed plane having a lifting angle of incidence and arranged between said braking planes, linkages between the latter and said fixed plane, and means for rocking said braking planes in opposite directions to positive and negative angles of incidence to produce head resistance.

In testimony whereof I affix my signature.

ELMER C. WHITE.